(12) United States Patent
Kao et al.

(10) Patent No.: US 8,520,153 B2
(45) Date of Patent: Aug. 27, 2013

(54) ZOOM LENS ARRAY AND SWITCHABLE TWO AND THREE DIMENSIONAL DISPLAY

(75) Inventors: Yung-Yuan Kao, Hsinchu County (TW); Chang-Po Chao, Taipei County (TW); Ci-Yi Shao, Taichung County (TW); Yuan-Pin Huang, Taipei County (TW); Kai-Xian Yang, Taipei (TW); Chi-Chung Tsai, Kinmen County (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 936 days.

(21) Appl. No.: 12/630,809

(22) Filed: Dec. 3, 2009

(65) Prior Publication Data

US 2011/0085094 A1    Apr. 14, 2011

(30) Foreign Application Priority Data

Oct. 9, 2009   (TW) ................................. 98134311 A

(51) Int. Cl.
*G02F 1/1335*  (2006.01)
*G02F 1/13*    (2006.01)

(52) U.S. Cl.
USPC ............... 349/7; 349/200; 359/665; 359/666; 359/694; 324/686; 396/133; 607/54

(58) Field of Classification Search
USPC ................... 607/54; 359/666, 694, 676, 665; 324/686; 349/7, 200; 396/133
See application file for complete search history.

(56) References Cited

U.S. PATENT DOCUMENTS

| 4,525,036 | A   | * | 6/1985  | Fujibayashi et al. ......... 359/688 |
| 7,558,003 | B2  | * | 7/2009  | Ohtake ..................... 359/684 |
| 2006/0028734 | A1 | * | 2/2006 | Kuiper et al. ............... 359/676 |
| 2007/0217022 | A1 | * | 9/2007 | Kuiper et al. ............... 359/666 |
| 2008/0211977 | A1 |   | 9/2008 | Ijzerman et al. |
| 2008/0252720 | A1 |   | 10/2008| Kim et al. |

OTHER PUBLICATIONS

Lin et al., "Tunable-Focus Cylindrical Liquid Crystal Lenses" Japanese Journal of Applied Physics, vol. 44, No. 1A, 2005, pp. 243-244.

* cited by examiner

*Primary Examiner* — Huyen Ngo
(74) *Attorney, Agent, or Firm* — Jianq Chyun IP Office

(57) ABSTRACT

A zoom lens array, including a liquid crystal layer, a first strip electrode, and a second strip electrode, is provided. The liquid crystal layer has a plurality of zoom regions. The first strip electrode is disposed on an upper side of the liquid crystal layer and located at the boundary between the zoom regions. The second strip electrode is disposed on a lower side of the liquid crystal layer and located at the boundary between the zoom regions. The first strip electrode and the second strip electrode are alternatively arranged. Moreover, a switchable two and three dimensional display with the above zoom lens array is also provided.

23 Claims, 5 Drawing Sheets

ZOOM LENS ARRAY AND SWITCHABLE TWO AND THREE DIMENSIONAL DISPLAY

CROSS-REFERENCE TO RELATED APPLICATION

This application claims the priority benefit of Taiwan application serial no. 98134311, filed on Oct. 9, 2009. The entirety of the above-mentioned patent application is hereby incorporated by reference herein and made a part of specification.

BACKGROUND OF THE INVENTION

1. Field of the Invention

The invention relates to a lens array and a display, and particularly relates to a zoom lens array and a switchable two and three dimensional display.

2. Description of Related Art

As display technology advances, displays have been developed from displaying a two dimensional image to displaying a three dimensional image. FIG. 1 is a schematic view of a lenticular lens array of a conventional three dimensional image display. Referring to FIG. 1, a lenticular lens array 100 is formed by a plurality of lenticular lenses 100A. An incident light L1 which passes through each of the lenticular lenses 100A is focused by the lenticular lenses 100A and forms an emitting light L2 proceeding along a left direction and a right direction. That is, the lenticular lens array 100 is capable of projecting the light of an image respectively to the left and right eyes of a viewer, so as to achieve three dimensional effects.

However, it is fairly difficult to fabricate the lenticular lenses 100A, and it costs a lot to reach the predetermined optical precision. In addition, the focal length of the lenticular lenses 100A is fixed and cannot be changed after the fabrication. The viewer can see three dimensional images only in a certain distance, which imposes a limitation to the use of the three dimensional image display.

FIG. 2 is a schematic view of a conventional liquid crystal zoom lens. As shown in FIG. 2, the liquid crystal zoom lens 200 includes a bottom glass substrate 210, a bottom electrode 220, a spacer 230, a liquid crystal layer 240, a top glass substrate 250, and a top electrode 260.

The positions of the foregoing elements are shown in FIG. 2, wherein the bottom electrode 220 is disposed on the bottom glass substrate 210. The spacer 230 is disposed on the bottom electrode 220. The top glass substrate 250 is disposed on the spacer 230. The liquid crystal layer 240 is located between the bottom electrode 220 and the top glass substrate 250. The top electrode 260 is disposed on the top glass substrate 250 and positioned at two ends of the top glass substrate 250.

It is noted that the top electrode 260 is a strip electrode and the bottom electrode 220 is a planar electrode. Such a configuration of electrodes can generate a non-uniform electric field distribution E in the liquid crystal layer 240. The non-uniform electric field distribution E varies the deflection (phase retardation) of the liquid crystal molecules (not shown) in different areas of the liquid crystal layer 240. A light (not shown) passing through a central part of the liquid crystal zoom lens 200 is faster than a light passing through a peripheral part of the liquid crystal zoom lens 200, resulting in focusing effect.

To generate a favorable focusing effect, the top glass substrate 250 which has a certain thickness needs to be disposed between the top electrode 260 and the liquid crystal layer 240. More specifically, because of the top glass substrate 250, a sufficient distance is maintained between the top electrode 260 and the bottom electrode 220 to gradually vary the electric field and generate the non-uniform electric field distribution E as shown in FIG. 2. Without the top glass substrate 250, the bottom electrode 220 and the top electrode 260 on both sides would be too close to each other. Consequently, electric field would be concentrated on two sides of the liquid crystal zoom lens 200, and the non-uniform electric field distribution E would not be formed. However, since it is required to dispose the top glass substrate 250, the thickness of the liquid crystal zoom lens 200 is increased and the structure of the liquid crystal zoom lens 200 is complicated. Moreover, the fabrication processes of the liquid crystal zoom lens 200 become more complex, which increases the production costs.

SUMMARY OF THE INVENTION

Accordingly, the invention provides a zoom lens array having special electrode configuration, thinner thickness, and simpler structure.

The invention further provides a switchable two and three dimensional display including the aforementioned zoom lens array for displaying favorable two dimensional or three dimensional images.

Based on the above, the invention provides a zoom lens array, including a liquid crystal layer, a first strip electrode, and a second strip electrode. The liquid crystal layer has a plurality of zoom regions. The first strip electrode is disposed on an upper side of the liquid crystal layer and located at a boundary between the zoom regions. The second strip electrode is disposed on a lower side of the liquid crystal layer and located at the boundary between the zoom regions, wherein the first strip electrode and the second strip electrode are alternatively arranged.

In one embodiment of the invention, the liquid crystal layer in each of the zoom regions allows a parallel light to pass when no voltage is supplied to the first strip electrode and the second strip electrode.

In one embodiment of the invention, an electric field distribution is formed in the liquid crystal layer in each of the zoom regions when a voltage is supplied to the first strip electrode and the second strip electrode, so as to form the liquid crystal layer in each of the zoom regions as a zoom lens.

In one embodiment of the invention, the zoom lens has a voltage-adjustable focal length. The voltage-adjustable focal length is controlled by the voltage.

In one embodiment of the invention, the liquid crystal layer is a positive liquid crystal layer.

In one embodiment of the invention, a refractive index of the liquid crystal layer is larger than or equal to 2.2.

In one embodiment of the invention, a material of the first strip electrode and the second strip electrode includes Indium Tin Oxide.

In one embodiment of the invention, the zoom lens array further includes a transparent shell, encompassing the liquid crystal layer, the first strip electrode, and the second strip electrode.

In one embodiment of the invention, the first strip electrode and the second strip electrode are embedded in the transparent shell.

In one embodiment of the invention, a material of the transparent shell includes a flexible transparent material.

In one embodiment of the invention, the zoom lens array further includes a first substrate, a second substrate, and a spacer, wherein the first substrate and the second substrate hold the liquid crystal layer, the first strip electrode, and the second strip electrode; the spacer is disposed between the first substrate and the second substrate and positioned corresponding to the first strip electrode and the second strip electrode.

Based on the above, the invention further provides a switchable two and three dimensional display, including the aforementioned zoom lens array and a display panel. The display panel is disposed on a side of the zoom lens array.

In one embodiment of the invention, the liquid crystal layer in each of the zoom regions allows a parallel light from the display panel to pass when no voltage is supplied to the first strip electrode and the second strip electrode, so as to display a two dimensional image.

In one embodiment of the invention, an electric field distribution is formed in the liquid crystal layer in each of the zoom regions when a voltage is supplied to the first strip electrode and the second strip electrode, so as to form the liquid crystal layer in each of the zoom regions as a zoom lens. The zoom lenses focus the parallel light from the display panel to display a three dimensional image.

In one embodiment of the invention, the zoom lens has a voltage-adjustable focal length. The voltage-adjustable focal length is controlled by the voltage.

In one embodiment of the invention, the liquid crystal layer is a positive liquid crystal layer.

In one embodiment of the invention, a refractive index of the liquid crystal layer is larger than or equal to 2.2.

In one embodiment of the invention, a material of the first strip electrode and the second strip electrode includes Indium Tin Oxide.

In one embodiment of the invention, the switchable two and three dimensional display further includes a transparent shell, encompassing the liquid crystal layer, the first strip electrode, and the second strip electrode.

In one embodiment of the invention, the first strip electrode and the second strip electrode are embedded in the transparent shell.

In one embodiment of the invention, a material of the transparent shell includes a flexible transparent material.

In one embodiment of the invention, the switchable two and three dimensional display further includes a first substrate, a second substrate, and a spacer, wherein the first substrate and the second substrate hold the liquid crystal layer, the first strip electrode, and the second strip electrode; the spacer is disposed between the first substrate and the second substrate and positioned corresponding to the first strip electrode and the second strip electrode.

In one embodiment of the invention, the display panel includes a liquid crystal display panel, a plasma display panel, or an organic LED display panel.

The zoom lens array of the invention has a special electrode configuration, namely the first strip electrode and the second strip electrode are alternatively arranged on two opposite sides of the liquid crystal layer. Therefore, a sufficient distance is maintained between the first strip electrode and the second strip electrode to form a non-uniform electric field distribution in the liquid crystal layer. Thereby, the zoom lens is formed in the liquid crystal layer for displaying a three-dimensional image.

In order to make the aforementioned and other features and advantages of the invention more comprehensible, several embodiments accompanied with drawings are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

[Zoom Lens Array]

Figure 3:
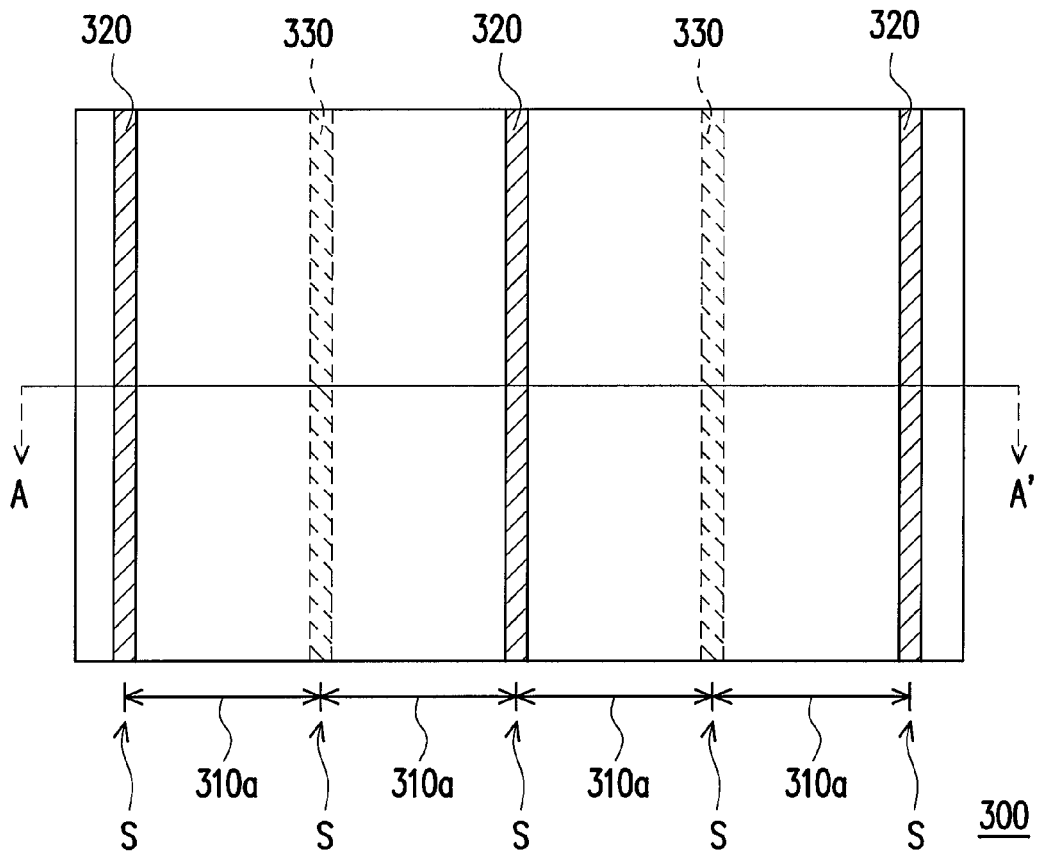
FIG. 3 is a schematic top view of a zoom lens array according to an exemplary embodiment of the invention.
Figure 4:
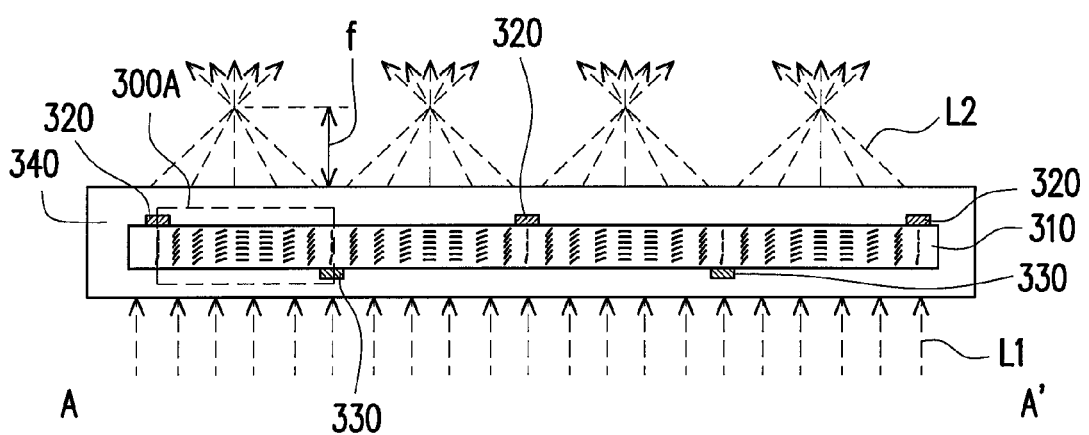
FIG. 4 is a schematic cross-sectional view along Line A-A' in FIG. 3.

FIG. 3 is a schematic top view of a zoom lens array according to an exemplary embodiment of the invention. FIG. 4 is a schematic cross-sectional view along Line A-A' in FIG. 3. Referring to FIGS. 3 and 4, a zoom lens array 300 includes a liquid crystal layer 310, a first strip electrode 320, and a second strip electrode 330. The liquid crystal layer 310 has a plurality of zoom regions 310a. The first strip electrode 320 is disposed on an upper side of the liquid crystal layer 310 and located at a boundary S between the zoom regions 310a. The second strip electrode 330 is disposed on a lower side of the liquid crystal layer 310 and located at the boundary S between the zoom regions 310a, wherein the first strip electrode 320 and the second strip electrode 330 are alternatively arranged.

Figure 1:
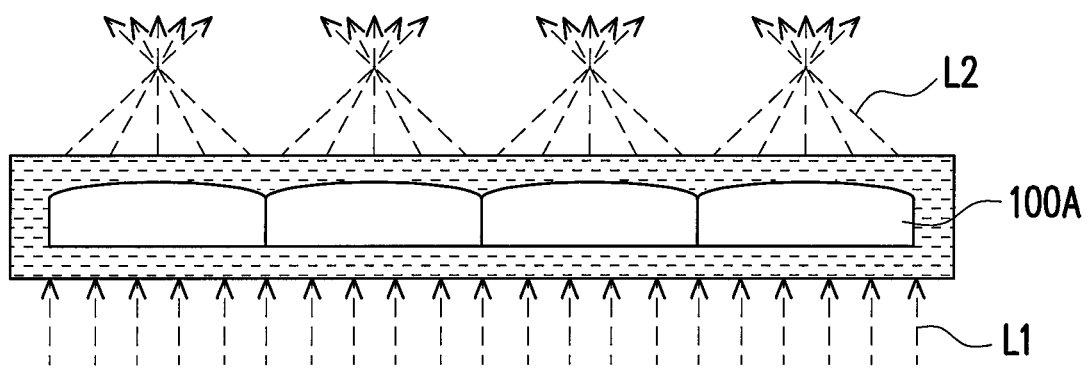
FIG. 1 is a schematic view of a lenticular lens array in a conventional three dimensional image display.
Figure 2:
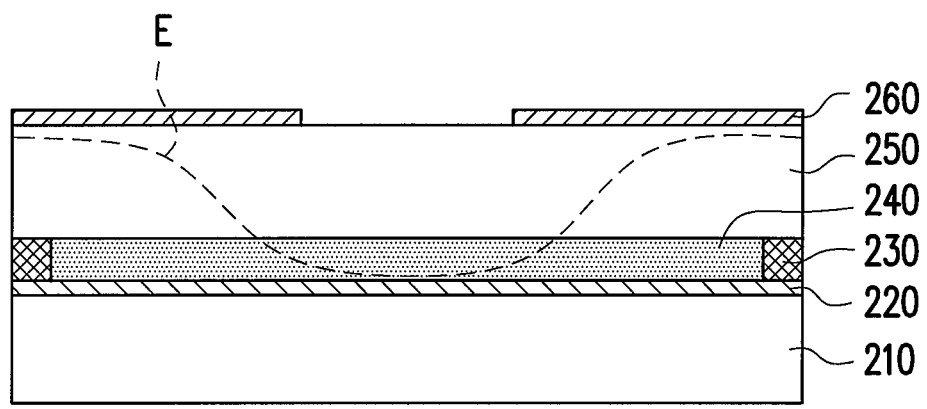
FIG. 2 is a schematic view of a conventional liquid crystal zoom lens.

In one embodiment, a material of the first strip electrode 320 and the second strip electrode 330 is a transparent conductive material such as Indium Tin Oxide. In particular, the first strip electrode 320 and the second strip electrode 330 are alternatively arranged on two opposite sides of the liquid crystal layer 230, so as to maintain a sufficient distance between the first strip electrode 320 and the second strip electrode 330 for forming a non-uniform electric field distribution. Compared with the conventional liquid crystal zoom lens 200 as shown in FIG. 2, the aforementioned zoom lens array 300 does not require an additional glass substrate. Thus, the thickness, weight, and size of the zoom lens array 300 are effectively reduced to make the zoom lens array 300 lighter and thinner. In addition, the widths of the first strip electrode 320 and the second strip electrode 330 are determined according to a curve of a refractive index of the zoom lens array 300.

Figure 9:
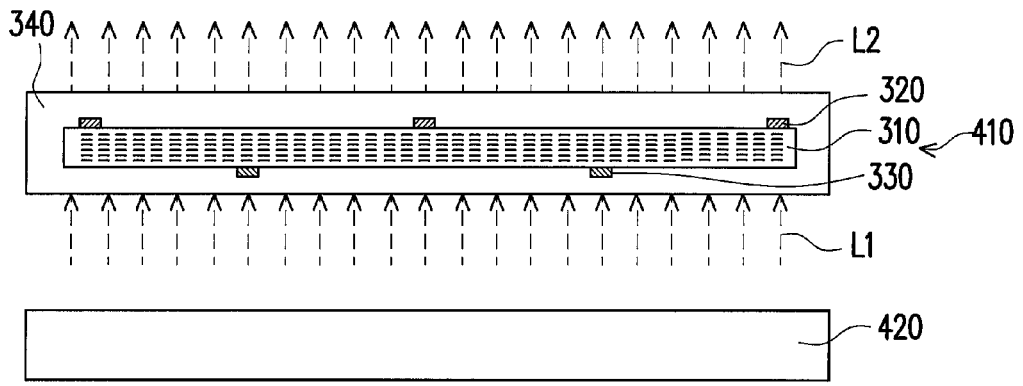
FIG. 9 is a schematic view of the switchable two and three dimensional display in FIG. 8 displaying a two dimensional image.

In one embodiment, the liquid crystal layer 310 in each of the zoom regions 310a allows a parallel light L1 to pass when no voltage is supplied to the first strip electrode 320 and the second strip electrode 330 (referring to FIG. 9). Further, as shown in FIG. 4 (or referring to FIG. 10), an electric field distribution is formed in the liquid crystal layer 310 in each of the zoom regions 310a when a voltage is supplied to the first strip electrode 320 and the second strip electrode 330, so as to form the liquid crystal layer 310 in each of the zoom regions 310a as a zoom lens 300A. The zoom lens 300A is capable of focusing the incident light L1 and directing an emergent light L2 to proceed along a right direction and a left direction. That is, the zoom lens 300A projects the light of an image respectively to the left and right eyes of a viewer, so as to achieve three dimensional effects.

Figure 5:
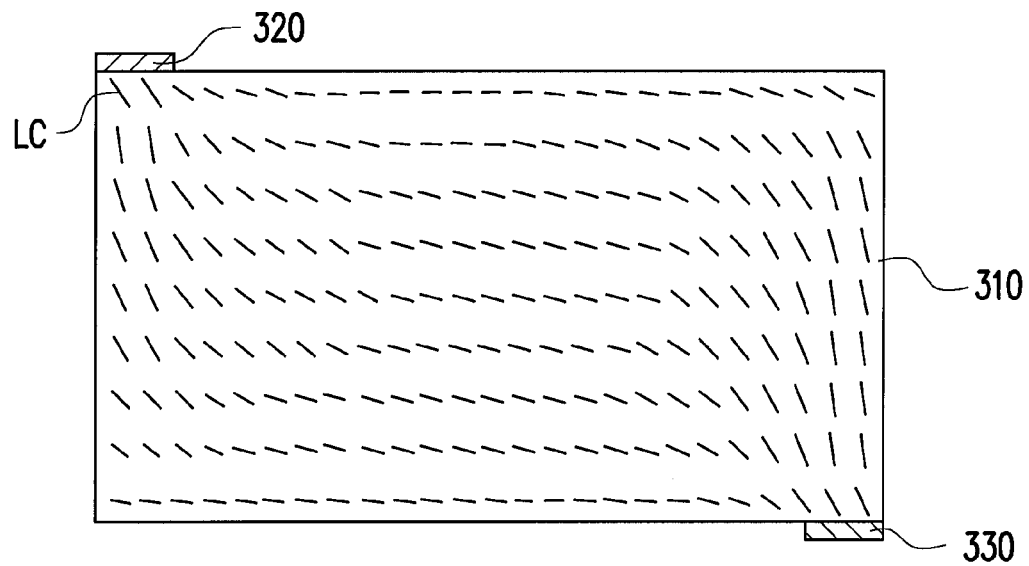
FIG. 5 depicts an arrangement of liquid crystal molecules of a liquid crystal layer under the influence of a non-uniform electric field distribution.

FIG. 5 depicts an arrangement of liquid crystal molecules of a liquid crystal layer under the influence of a non-uniform electric field distribution. Referring to FIG. 5, since the first strip electrode 320 and the second strip electrode 330 are alternatively arranged on different sides in the zoom lens 300A, the non-uniform electric field distribution is effectively generated to deflect liquid crystal molecules LC in the liquid crystal layer 310.

The liquid crystal layer 310 is a positive liquid crystal layer. It is noted that the liquid crystal molecules LC at the positions of the first strip electrode 320 and the second strip electrode 330 are affected by a longitudinal electric field and remain erect; the liquid crystal molecules LC at a central position are affected by a transversal electric field and remain toppled. The aforementioned arrangement of the liquid crystal molecules LC enables the zoom lens 300A to generate an effect of optical focusing, similar to a convex lens. Moreover, a refractive index of the liquid crystal layer 310 is larger than or equal to 2.2. The larger the refractive index is, the better lens power the zoom lens 300A has (i.e. focusing capacity is improved and focal length is shortened).

Figure 6:
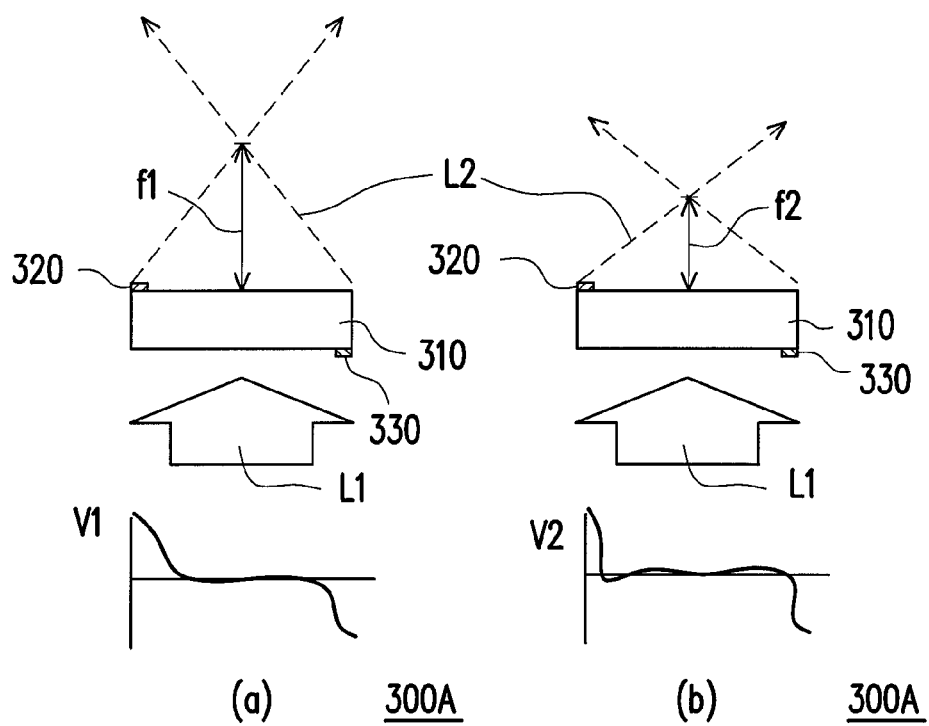
FIGS. 6(a) and 6(b) depict a zoom lens having different voltage-adjustable focal lengths under different voltages.

FIGS. 6(a) and 6(b) depict a zoom lens having different voltage-adjustable focal lengths under different voltages. With reference to FIG. 4, the zoom lens 300A has a voltage-adjustable focal length f, and the voltage-adjustable focal length f is controllable by the voltage. To be more specific, as shown in FIG. 6(a), a voltage-adjustable focal length f1 is obtained when the supplied voltage is V1. As shown in FIG. 6(b), a voltage-adjustable focal length f2 is obtained when the supplied voltage is V2. Hence, the focal length of the zoom lens 300A is variable. The viewer can adjust a viewing distance at will, and the use of the three dimensional display is made more convenient.

Since the voltage V2 is larger than the voltage V1, the voltage-adjustable focal length f2 is shorter than the voltage-adjustable focal length f1. More specifically, when the voltage V2 is increased, the zoom lens 300A as shown in FIG. 6(b) has better lens power (i.e. focusing capacity is improved and focal length is shortened). In other words, based on the voltages in FIG. 6(b), the focusing of the incident light L1 is improved and the emergent light L2 is directed along two directions which have a larger included angle. Accordingly, a wider viewing range is achieved. Moreover, given that a focal point distance remains unchanged, a cell gap of the liquid crystal layer 310 can be made thinner if the lens power is increased.

Referring to FIG. 4, the zoom lens array 300 further includes a transparent shell 340. The transparent shell 340 encompasses the liquid crystal layer 310, the first strip electrode 320, and the second strip electrode 330. In particular, the first strip electrode 320 and the second strip electrode 330 are embedded in the transparent shell 340. In addition, a material of the transparent shell 340 is, for example, a flexible transparent material.

Figure 7:
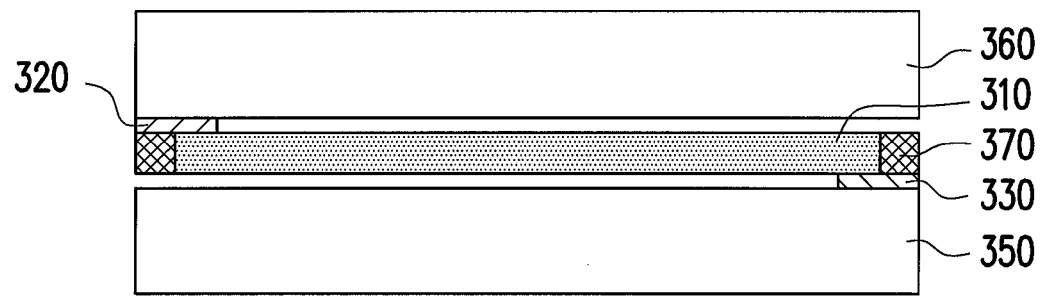
FIG. 7 is a schematic view of another zoom lens array according to an exemplary embodiment of the invention.

FIG. 7 is a schematic view of another zoom lens array according to an exemplary embodiment of the invention. In FIG. 7 and FIG. 4, identical elements are represented by the same reference numbers. Therefore, detailed descriptions thereof are not repeated hereinafter. It is noted that a package structure of a zoom lens array 302 is different from a package structure of the zoom lens array 300. Referring to FIG. 7, in addition to the aforementioned liquid crystal layer 310, first strip electrode 320, and second strip electrode 330, the zoom lens array 302 further includes: a first substrate 350, a second substrate 360, and a spacer 370. In particular, the first substrate 350 and the second substrate 360 hold the liquid crystal layer 310, the first strip electrode 320, and the second strip electrode 330; the spacer 370 is disposed between the first substrate 350 and the second substrate 360 and positioned corresponding to the first strip electrode 320 and the second strip electrode 330.

Based on the above, the zoom lens arrays 300 and 302 have the aforementioned special electrode configuration, namely the first strip electrode 320 and the second strip electrode 330 are alternatively arranged on two sides of the liquid crystal layer 310, so as to effectively generate the non-uniform electric field distribution for deflecting the liquid crystal molecules LC in the liquid crystal layer 310. As a consequence, the zoom lens 300A achieves focusing effects, similar to a convex lens. Since no additional glass substrate is required, the thickness of the zoom lens array 300 is reduced.

[Switchable Two and Three Dimensional Display]

Figure 8:
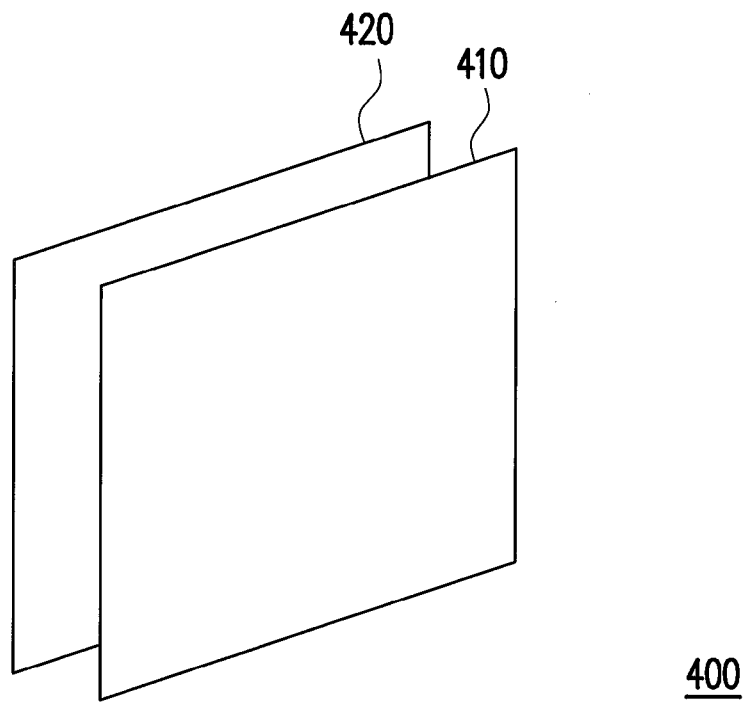
FIG. 8 is a schematic view of a switchable two and three dimensional display according to an exemplary embodiment of the invention.
Figure 10:
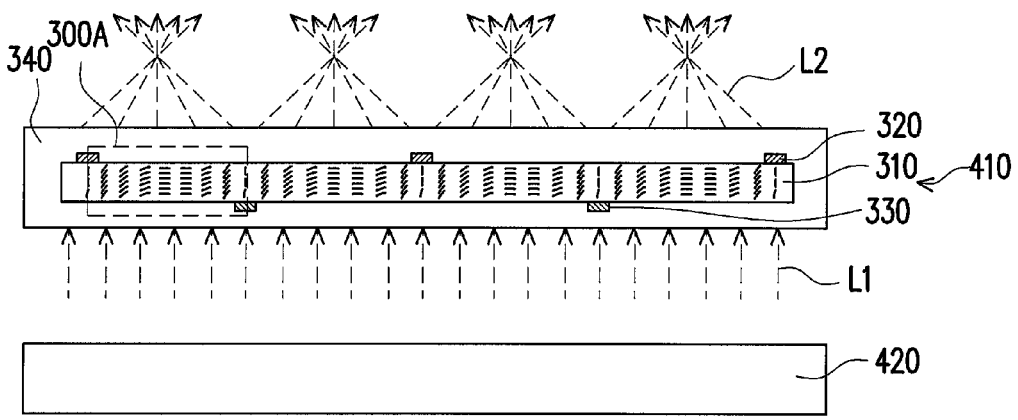
FIG. 10 is a schematic view of the switchable two and three dimensional display in FIG. 8 displaying a three dimensional image.

FIG. 8 is a schematic view of a switchable two and three dimensional display according to an exemplary embodiment of the invention. FIG. 9 is a schematic view of the switchable two and three dimensional display in FIG. 8 displaying a two dimensional image. FIG. 10 is a schematic view of the switchable two and three dimensional display in FIG. 8 displaying a three dimensional image.

Referring to FIG. 8, the switchable two and three dimensional display 400 includes a zoom lens array 410 and a display panel 420. The display panel 420 is disposed on a side of the zoom lens array 410. It is noted that the zoom lens array 410 can the zoom lens array 300 or 302 as described above. The display panel 420 is a liquid crystal display panel, a plasma display panel, an organic LED display panel, or any other suitable display panel.

Referring to FIG. 9, the liquid crystal layer 310 in each of the zoom regions 310a allows a parallel light (i.e. the incident light L1) from the display panel 420 to pass when no voltage is supplied to the first strip electrode 320 and the second strip electrode 330, so as to display a two dimensional image (i.e. the parallel emergent light L2). As shown in FIG. 9, a path of the incident light L1 emitted from the display panel 420 remains unchanged when the incident light L1 passes through the liquid crystal layer 310. Therefore, the emergent light L2 is also a parallel light. Accordingly, the two dimensional image displayed by the display panel 420 is not influenced by the zoom lens array 410 and thus the viewer can see the two dimensional image.

Referring to FIG. 10, the electric field distribution is formed in the liquid crystal layer 310 in each of the zoom regions 310a when a voltage is supplied to the first strip electrode 320 and the second strip electrode 330, so as to form the liquid crystal layer 310 in each of the zoom regions 310a as the zoom lens 300A. The zoom lens 300A focuses a parallel light (i.e. the incident light L1) from the display panel 420, so as to display a three dimensional image (i.e. the emergent light L2 directed along the left and the right directions). As shown in FIG. 10, the path of the incident light L1 emitted from the display panel 420 is changed to focus when the incident light L1 passes through the liquid crystal layer 310. Therefore, the emergent light L2 proceeding along the left and the right directions forms a three dimensional image.

The displays of two and three dimensional images are switched based on whether the voltage is supplied. How to embody the zoom lens array 400 has been described and illustrated in FIGS. 3~7. Therefore, detailed descriptions thereof are not repeated hereinafter.

In conclusion of the above, the zoom lens array and the switchable two and three dimensional display of the invention have at least the following advantages:

In the zoom lens array, the first strip electrode and the second strip electrode are alternatively arranged on two opposite sides of the liquid crystal layer. Therefore, no additional glass substrate is required. And, the thickness and weight of the zoom lens array are reduced. The zoom lens array has the voltage-adjustable focal length, which allows the viewer to vary the viewing distance at will. Moreover, the displays of two and three dimensional images are switchable according to whether the voltage is supplied.

Although the invention has been described with reference to the above embodiments, it is apparent to one of ordinary skill in the art that modifications to the described embodiments may be made without departing from the spirit of the invention. Accordingly, the scope of the invention is defined by the attached claims not by the above detailed descriptions.

What is claimed is:

1. A zoom lens array, comprising:
   a liquid crystal layer having a plurality of zoom regions;
   a first strip electrode disposed on an upper side of the liquid crystal layer and located at a boundary between the zoom regions; and
   a second strip electrode disposed on a lower side of the liquid crystal layer and located at the boundary between the zoom regions, wherein the first strip electrode and the second strip electrode are alternatively arranged.

2. The zoom lens array as claimed in claim 1, wherein a parallel light is passed through the liquid crystal layer in each of the zoom regions when no voltage is supplied to the first strip electrode and the second strip electrode.

3. The zoom lens array as claimed in claim 1, wherein an electric field distribution is formed in the liquid crystal layer in each of the zoom regions when a voltage is supplied to the first strip electrode and the second strip electrode, so as to form the liquid crystal layer in each of the zoom regions as a zoom lens.

4. The zoom lens array as claimed in claim 3, wherein the zoom lens has a voltage-adjustable focal length controlled by the voltage.

5. The zoom lens array as claimed in claim 1, wherein the liquid crystal layer is a positive liquid crystal layer.

6. The zoom lens array as claimed in claim 1, wherein a refractive index of the liquid crystal layer is larger than or equal to 2.2.

7. The zoom lens array as claimed in claim 1, wherein a material of the first strip electrode and the second strip electrode comprises Indium Tin Oxide.

8. The zoom lens array as claimed in claim 1, further comprising a transparent shell encompassing the liquid crystal layer, the first strip electrode, and the second strip electrode.

9. The zoom lens array as claimed in claim 8, wherein the first strip electrode and the second strip electrode are embedded in the transparent shell.

10. The zoom lens array as claimed in claim 8, wherein a material of the transparent shell comprises a flexible transparent material.

11. The zoom lens array as claimed in claim 1, further comprising a first substrate, a second substrate, and a spacer;
    wherein the first substrate and the second substrate hold the liquid crystal layer, the first strip electrode, and the second strip electrode; and
    the spacer is disposed between the first substrate and the second substrate and positioned corresponding to the first strip electrode and the second strip electrode.

12. A switchable two and three dimensional display, comprising:
    a zoom lens array, comprising:
       a liquid crystal layer having a plurality of zoom regions;
       a first strip electrode disposed on an upper side of the liquid crystal layer and located at a boundary between the zoom regions;
       a second strip electrode disposed on a lower side of the liquid crystal layer and located at the boundary between the zoom regions, wherein the first strip electrode and the second strip electrode are alternatively arranged; and
    a display panel disposed on a side of the zoom lens array.

13. The switchable two and three dimensional display as claimed in claim 12, wherein a parallel light from the display panel is passed through the liquid crystal layer in each of the zoom regions when no voltage is supplied to the first strip electrode and the second strip electrode, so as to display a two dimensional image.

14. The switchable two and three dimensional display as claimed in claim 12, wherein an electric field distribution is formed in the liquid crystal layer in each of the zoom regions when a voltage is supplied to the first strip electrode and the second strip electrode, so as to form the liquid crystal layer in each of the zoom regions as a zoom lens;
    the zoom lenses focus a parallel light from the display panel to display a three dimensional image.

15. The switchable two and three dimensional display as claimed in claim 14, wherein the zoom lens has a voltage-adjustable focal length controlled by the voltage.

16. The switchable two and three dimensional display as claimed in claim 12, wherein the liquid crystal layer is a positive liquid crystal layer.

17. The switchable two and three dimensional display as claimed in claim 12, wherein a refractive index of the liquid crystal layer is larger than or equal to 2.2.

18. The switchable two and three dimensional display as claimed in claim 12, wherein a material of the first strip electrode and the second strip electrode comprises Indium Tin Oxide.

19. The switchable two and three dimensional display as claimed in claim 12, further comprising a transparent shell encompassing the liquid crystal layer, the first strip electrode, and the second strip electrode.

20. The switchable two and three dimensional display as claimed in claim 19, wherein the first strip electrode and the second strip electrode are embedded in the transparent shell.

21. The switchable two and three dimensional display as claimed in claim 19, wherein a material of the transparent shell comprises a flexible transparent material.

22. The switchable two and three dimensional display as claimed in claim 12, further comprising a first substrate, a second substrate, and a spacer;
    wherein the first substrate and the second substrate hold the liquid crystal layer, the first strip electrode, and the second strip electrode; and
    the spacer is disposed between the first substrate and the second substrate and positioned corresponding to the first strip electrode and the second strip electrode.

23. The switchable two and three dimensional display as claimed in claim 12, wherein the display panel comprises a liquid crystal display panel, a plasma display panel, or an organic LED display panel.

* * * * *